Figure 1:
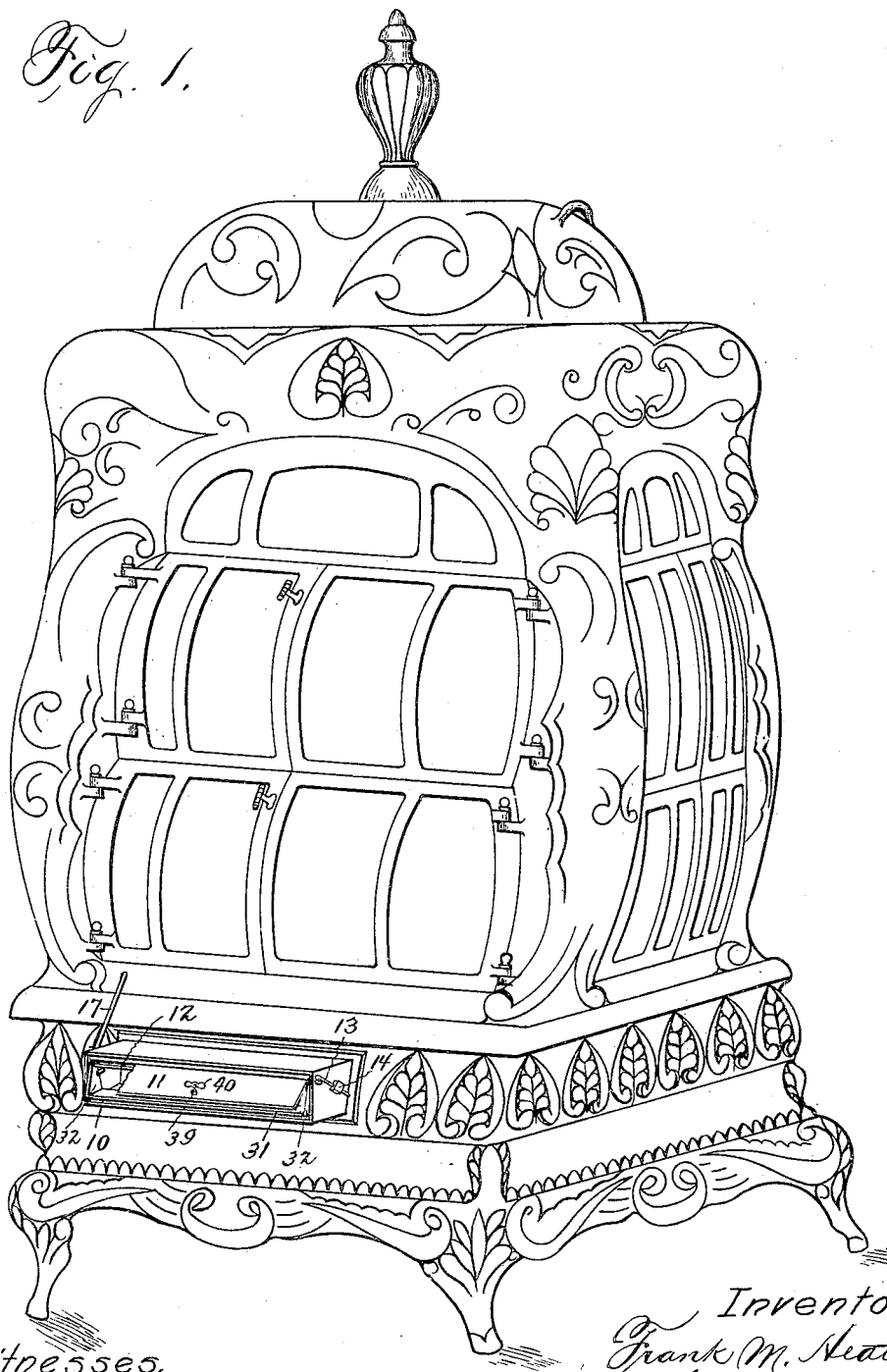

F. M. HEATH.
DRAFT REGULATOR.
APPLICATION FILED SEPT. 1, 1908.

979,069.

Patented Dec. 20, 1910.
4 SHEETS—SHEET 1.

Witnesses.
J. R. Hoover
M. L. Pugh

Inventor.
Frank M. Heath
by Chas. J. Williamson
Attorney.

F. M. HEATH.
DRAFT REGULATOR.
APPLICATION FILED SEPT. 1, 1908.
979,069.
Patented Dec. 20, 1910.
4 SHEETS—SHEET 2.
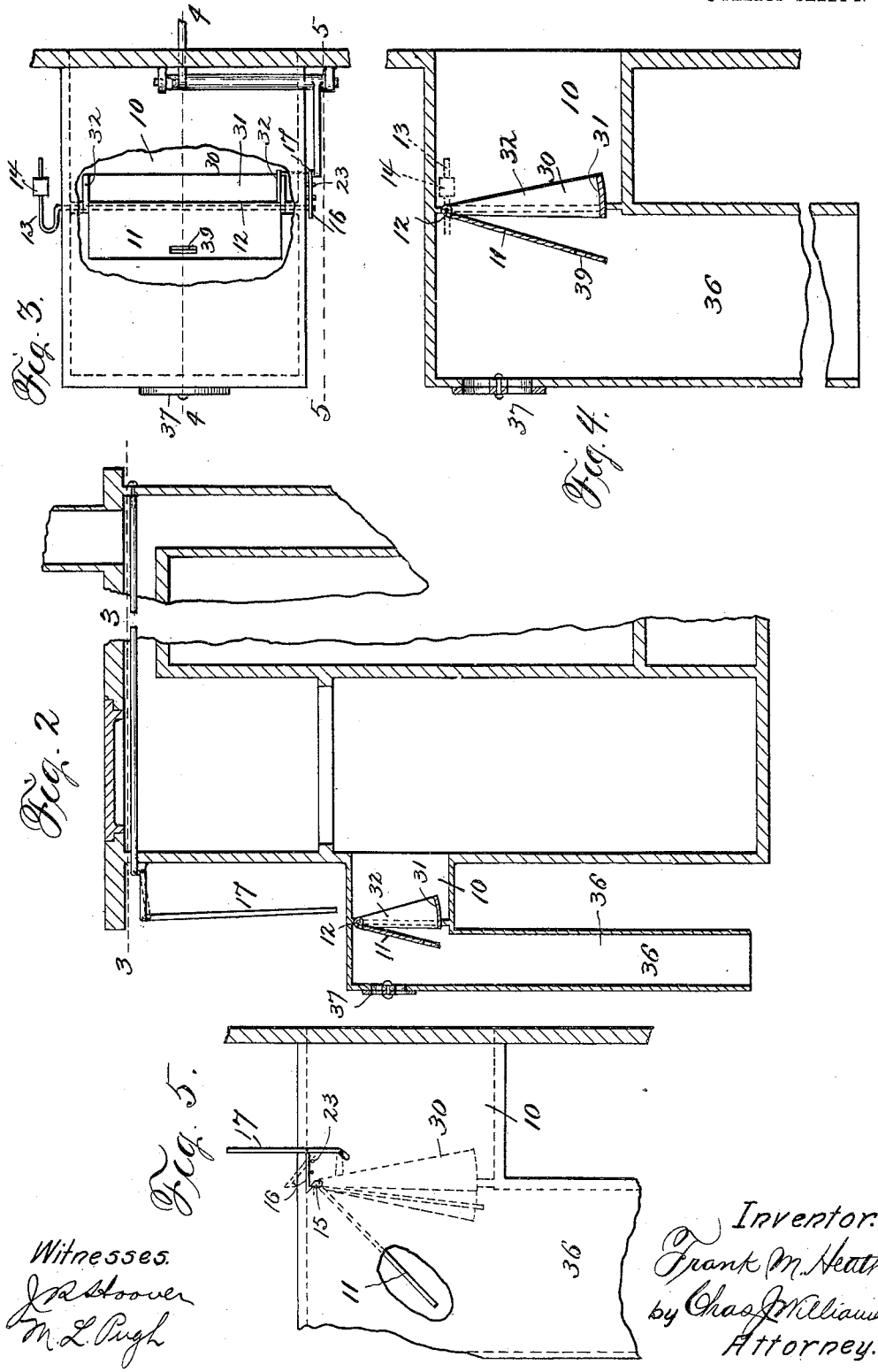
Witnesses.
J. R. Hoover
M. L. Pugh
Inventor.
Frank M. Heath,
by Chas. J. Williamson
Attorney.

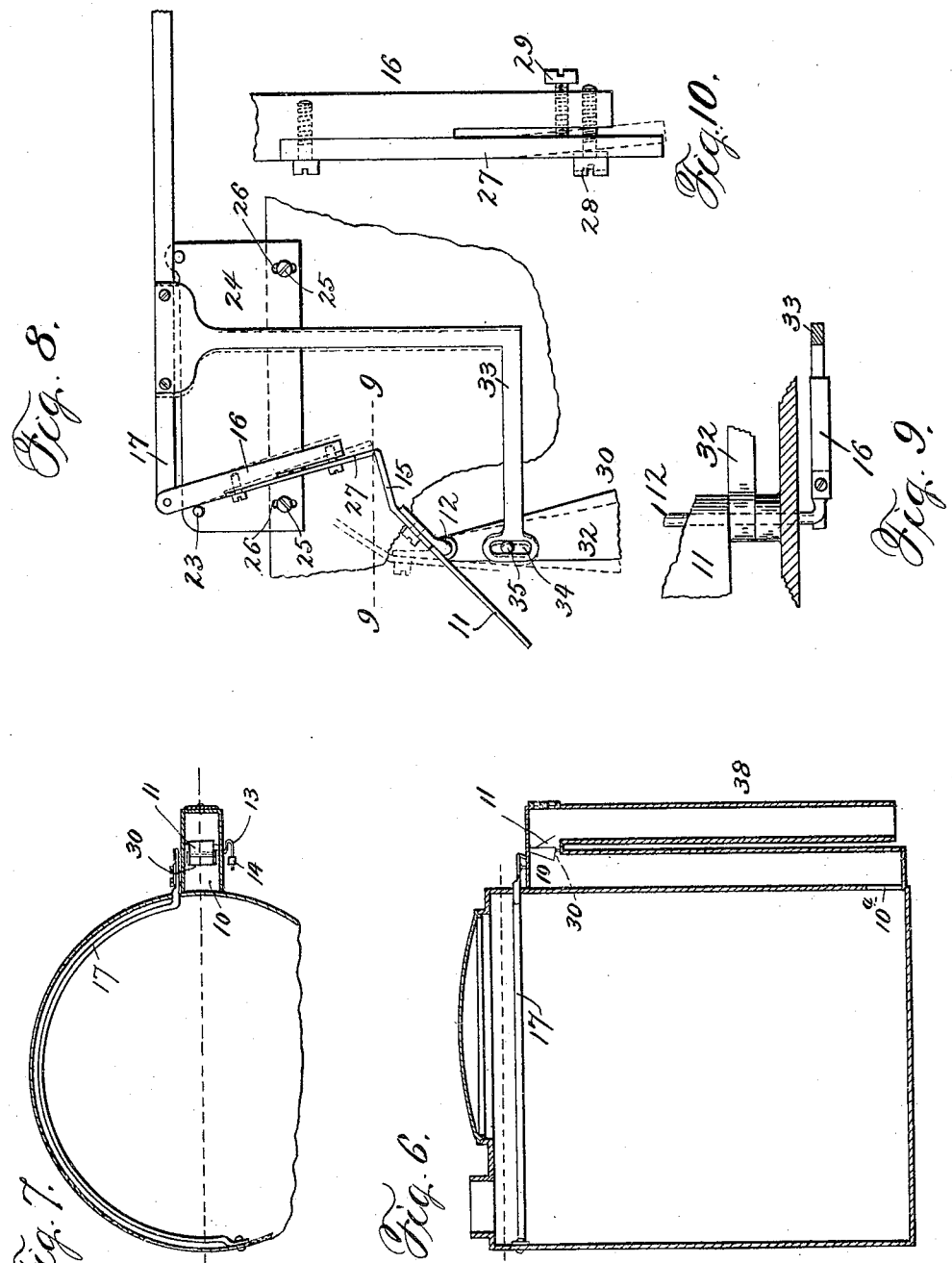

F. M. HEATH.
DRAFT REGULATOR.
APPLICATION FILED SEPT. 1, 1908.
979,069.
Patented Dec. 20, 1910.
4 SHEETS—SHEET 4.
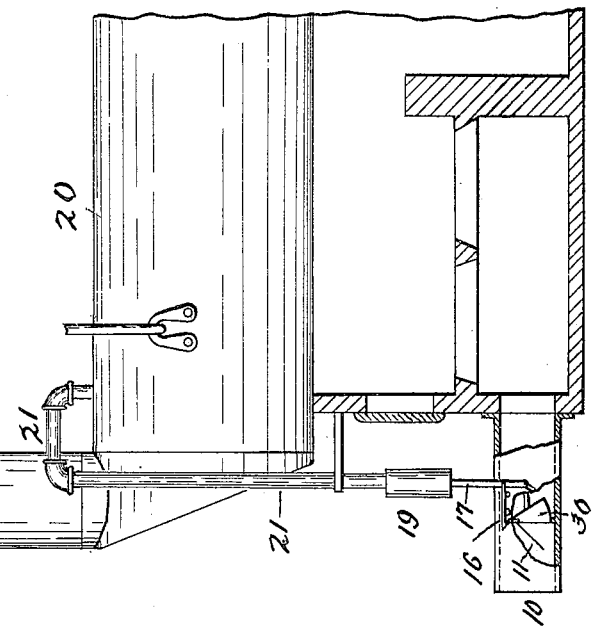
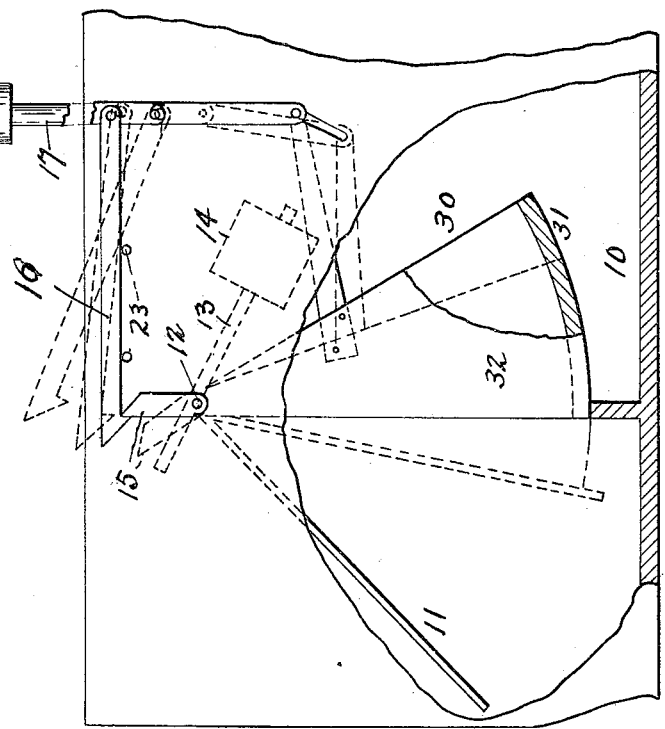
Witnesses.
M. L. Pugh.
N. J. Jones.
Inventor.
Frank M. Heath.
by Chas. J. Williamson
Attorney.

UNITED STATES PATENT OFFICE.

FRANK M. HEATH, OF PORTLAND, OREGON.

DRAFT-REGULATOR.

979,069. Specification of Letters Patent. Patented Dec. 20, 1910.

Application filed September 1, 1908. Serial No. 451,196.

*To all whom it may concern:*

Be it known that I, FRANK M. HEATH, of Portland, in the county of Multnomah and in the State of Oregon, have invented a certain new and useful Improvement in Draft-Regulators, and do hereby declare that the following is a full, clear, and exact description thereof.

My invention relates to means for regulating or controlling automatically the draft openings of stoves, furnaces, or other heat generators, my object being the attainment of as perfect regulation as is possible automatically, to maintain a desired degree of heat and prevent the waste of fuel, and to such end my invention consists in the automatic draft controlling means constructed substantially as hereinafter specified and claimed.

Referring to the drawings, Figure 1 is a perspective view of an ordinary heating stove provided with an automatic regulator embodying my invention; Fig. 2 is a view in vertical section of a portion of a cooking range provided with my invention; Fig. 3 a horizontal section on the line 3—3 of Fig. 2; Fig. 4 a detail section similar to Fig. 2 but on a larger scale; Fig. 5 a view partly in side elevation and partly in section on the line 5—5 of Fig. 3; Fig. 6 a vertical section of a stove having its draft inlet at the bottom, and taking air near the floor, when provided with my invention; Fig. 7 a horizontal section; Fig. 8 is a detail view of the automatic damper operating mechanism in one of its preferable forms; Fig. 9 is a detail section on the line 9—9 of Fig. 8; Fig. 10 a detail enlarged view of the damper latching or holding pawl or dog illustrated in Fig. 8; Fig. 11 a view partly in side elevation and partly in section showing my invention embodied in a draft regulator for steam boiler furnaces and Fig. 12 is a detail enlarged view of said draft regulator.

In the embodiments of my invention which I have selected for illustration, I prefer to locate my draft controlling devices in the draft inlet 10 of the stove or furnace, and as will be best seen by reference to Figs. 2, 5 and 8, I pivot in the draft inlet a door or damper in the form of a simple plate 11, the pivoting means being a horizontal rod 12, from which the plate is suspended so that it may swing to and from position to close the inlet. Attached to the pivot rod 12, preferably outside the draft inlet, is a radial arm 13, on which is mounted a weight 14 that may be adjusted toward and from the pivot rod 12 so as to fix the damper 11 in a predetermined position with reference to the inlet, when, as is hereinafter pointed out, the damper is free to move. By means of the weight 14, the damper 11 may be so counterbalanced that it will normally stand, when subjected to no other influences than the force of gravity, at a predetermined angle in the draft inlet and thereby form a draft area through the draft inlet of a desired size. Also attached to the damper pivot rod 12, and on the outside of the stove, is a radially projecting finger or arm 15 which is adapted to be engaged by a latch or pawl 16 when the damper is swung to a position to give the maximum area to the draft inlet or passage, and said latch or pawl at its end opposite its arm-engaging end is pivotally connected to a rod or bar 17 which is adapted to be moved to a point to release the arm 15 when a predetermined temperature is produced in the stove or furnace, and thereby release the damper 11 and permit it to move to the point permitted by the location of the counterbalance weight 14 to restrict or contract the area of the draft inlet. In the form of my invention illustrated in Figs. 1 to 8, the rod or bar 17 is either a thermostat and located in the stove or furnace where it is exposed to the heat thereof, or it is connected to a thermostat located in the stove or furnace for the proper action of the heat upon it. In the form of my invention illustrated in Fig. 11, the rod 17 is a piston rod of a piston 18, located in a cylinder 19. One side of the piston is subjected to steam pressure taken from the boiler 20 by means of a pipe 21, while the other side is subjected to the action of a spring 22.

The latch or pawl 16 is fulcrumed intermediate its ends and its fulcrum consists preferably of a pin or stud 23 against which the latch or pawl lies, and said fulcrum-forming pin or stud may be conveniently mounted, as illustrated in Fig. 8, upon a plate 24 adjustably secured to the stove or furnace by bolts or screws 25 passing through slots 26 in said plate. For the purpose of adjustment, the pawl 16 may, as shown in Figs. 8 and 10, be in the form of a bar or arm having attached to it a flexible strip 27 which is acted upon on opposite sides by screws 28 and 29, by which it may be moved in either of two directions and there held. If preferred, said strip 27 may be of spring metal, in which case the screw 28 may be omitted.

In order to regulate or control the draft to a degree beyond the capacity of the damper 11, I employ a supplemental damper 30 in the draft passage 10, which consists of a plate 31 hung by arms 32 at its opposite ends from the pivot rod 12, which by swinging to and fro relative to the damper 11, will vary the size of the opening between the damper 11 and the damper plate 31. The movements of the damper 30 are also automatically produced according to the state of the temperature in the stove or furnace, by means of the rod 17, to which it may be connected, as illustrated in Fig. 8, by means of an angle shaped bar or arm 33, said arm being secured at one end to the rod 17, and at its other end provided with a slot 34 that engages a stud or pin 35 on one of the damper-supporting arms 32.

It will be seen that the contraction of the draft opening from its maximum area by releasing the damper 11 until it swings to a closed position as far as the weight 14 will permit it, and then the nicer or closer regulation of the size of the draft opening are both effected automatically from the movement of the rod 17, produced either by the direct action of the heat thermostatically, or by means of pressure of steam, as when the draft of a steam boiler furnace is being regulated.

As is clearly illustrated in Fig. 3, the arm which carries the counterbalance weight 14 is extended to both sides of the axis of the pivot rod, so that it is possible, by shifting the weight 14, to place it in a position where it will hold the damper 11 in a closed position.

In the embodiment of my invention shown in Fig. 1, it is applied to a heating stove with the air inlet in front at the bottom; as illustrated in Figs. 2 to 5, it is applied to a range with the draft inlet entering below the fire box, and having a downward extension 36 reaching nearly to the floor for the removal of cold and foul air therefrom, an ordinary adjustable draft opening 37 being provided in the wall in line with the draft inlet 10; and in the embodiment of my invention shown in Figs. 6 and 7, it is adapted to a heating stove having its air inlet 10ª at the bottom to which air is conducted through an inverted U-shaped flue 38 from near the floor, and in this instance the thermostatic rod 17 is curved to lie close to the stove wall, instead of being carried straight across, which in some types of stove is objectionable. The door or damper 11 may be provided with a small hole 39, and as shown in Fig. 1. said hole may be closed wholly or partially by a cover 40.

The operation of my invention is as follows: When the fire is started, the door or damper 11 is secured in its wide open position by means of the pawl 16. When the temperature rises to a point where it is desired to check the strong draft thus afforded, the thermostat expands, or the piston is moved sufficiently to rock the pawl on its fulcrum to release the arm 15, and thus allow the damper 11 to swing to a partially closed position, it being arrested at the desired point by the action of its counterbalance 14. Thereafter any rise in temperature will result in the automatic movement of the damper 30 toward the damper 11, to contract the area of the draft inlet to suit the temperature.

When the counterbalance weight 14 is adjusted to a position which prevents the entire closing of the damper 11 by the action of gravity, it will be evident that the damper 11 under the pressure of a strong draft passing through the draft inlet 10 will move toward the damper 30. Thus contraction of the area of the draft inlet will be produced by the conjoint operation of the two dampers. In like manner, in case of a sudden or heavy wind causing a rush of air through the flue, the damper 11 will move toward the damper 30 and thus check the sudden rush of the air which otherwise would result in a needless consumption of fuel and waste of heat up the flue, and it will be seen by the employment of my invention all the conditions which would result in needless consumption of fuel and waste of heat produced are provided for by automatically operated mechanism and a regular and uniform degree of temperature maintained. I locate my draft-controlling means in the draft inlet so that there may be no obstruction whatever in the flue or chimney leading from the stove or heater, as thereby any tendency to deposit soot in the flue is avoided, and there is no tendency to smoke when the fuel door is open.

The weight 14 is adjusted to control the damper 11 according to the requirements of the particular stove or heater, the temperature desired to be maintained, and the character of the fuel used.

By means of the adjustment of the pawl 16, which is provided for by the construction illustrated in Figs. 8, 9 and 10, the angle of inclination of the door or damper 11 when held wide open may be varied.

Having thus described my invention, what I claim is—

1. In a draft regulator, the combination of two dampers coöperating with the same flue or passage, one being movable toward and from the other to vary the size of the draft passage, automatic heat-operated means for causing movement of one of said dampers to a predetermined position with reference to the flue or passage, and a device actuated by said heat-operated means adapted for controlling the movements of the other damper subsequently.

2. In a draft regulator, the combination of a damper, means for latching the damper in an open position, automatic heat-controlled means for releasing the damper, means to arrest the damper before it reaches a fully closed position, and automatic means to vary the size of the draft opening formed by the damper in its arrested position.

3. In a draft regulator, the combination of a damper, a latch for holding it in an open position, a second damper coöperating with the first to regulate the size of the draft opening, and automatic heat-operated means for releasing the latch lever and moving the second damper.

4. In combination with a stove or the like having a draft inlet, a pair of dampers mounted in said inlet, means for latching one of said dampers in an open position, and automatic heat-controlled means for unlatching said damper and for moving the other damper.

In testimony that I claim the foregoing I have hereunto set my hand.

FRANK M. HEATH.

Witnesses:
   TRUMAN J. GLOVER,
   LESTER L. CURL.